United States Patent [19]

King

[11] 4,240,851
[45] Dec. 23, 1980

[54] METHOD FOR RECAPPING SOLID TIRES WITH PRECURED, PREMOLDED TREAD

[75] Inventor: Michael J. King, Concord, Calif.

[73] Assignee: Oliver Tire and Rubber Company, Oakland, Calif.

[21] Appl. No.: 963,223

[22] Filed: Nov. 24, 1978

[51] Int. Cl.³ .............................................. B29H 17/37
[52] U.S. Cl. ..................................... 156/96; 156/112; 156/404
[58] Field of Search ............... 156/95, 96, 110 R, 112, 156/113, 394, 404

[56] References Cited

U.S. PATENT DOCUMENTS

| | | | |
|---|---|---|---|
| 1,330,128 | 2/1920 | Long | 156/96 |
| 2,014,010 | 9/1935 | Wheatley | 156/96 |
| 3,779,832 | 12/1973 | Reppel | 156/96 |
| 3,884,739 | 5/1975 | Hindin et al. | 156/96 |
| 3,917,440 | 11/1975 | Huebert | 156/96 |
| 3,925,129 | 12/1975 | Blankenship | 156/96 |
| 3,989,428 | 11/1976 | Cox | 156/96 |
| 4,028,168 | 6/1977 | Wolfe | 156/394 |
| 4,115,171 | 9/1978 | Dundon | 156/96 |

*Primary Examiner*—John E. Kittle
*Attorney, Agent, or Firm*—Owen, Wickersham & Erickson

[57] ABSTRACT

A method for recapping a solid tire with precured tread rubber is disclosed. The method comprises preparing a used solid tire for recapping, including buffing down the tire to remove the old tread and to prepare the surface; applying intermediate bonding material including cushion gum; adding precured padding stock for a base layer where needed; applying and splicing together the precured tread rubber strip; placing wicking material across the tread rubber surface, for air bleeding; enveloping the tire; placing the enveloped tire assembly in a curing module having annular sealing means that can be pressed against the envelope at both tire sidewalls to form a sealed space around the envelope; and supplying heat and pressure in the space to press the envelope and tread rubber against the tire carcass while curing the internal layer(s) of bonding material, thereby securing the layers together and forming an integral retreaded tire.

8 Claims, 10 Drawing Figures

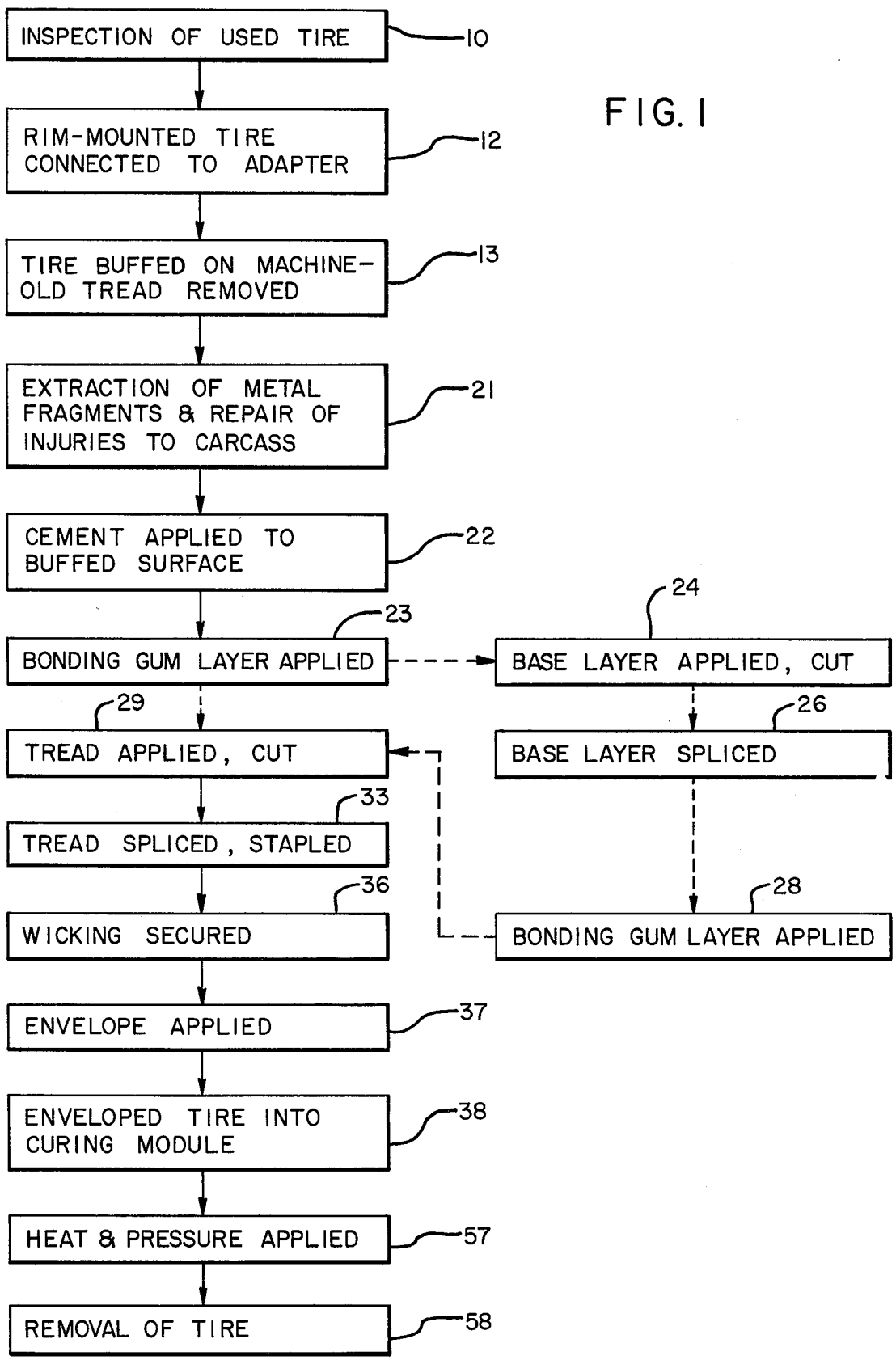

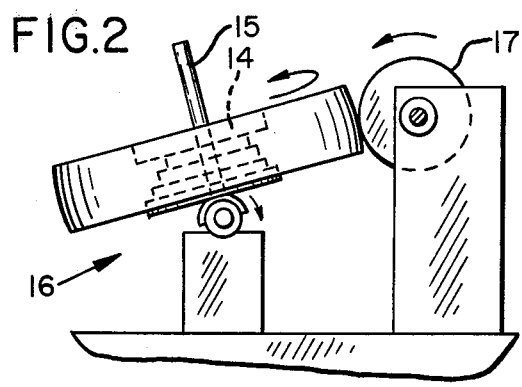
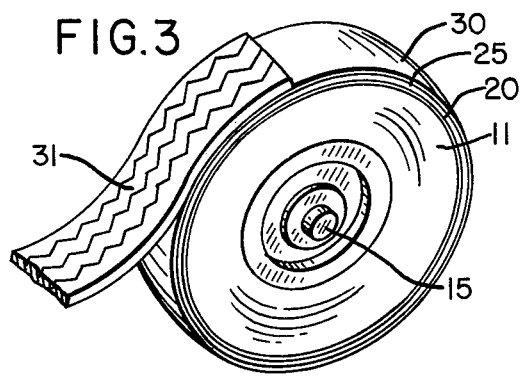
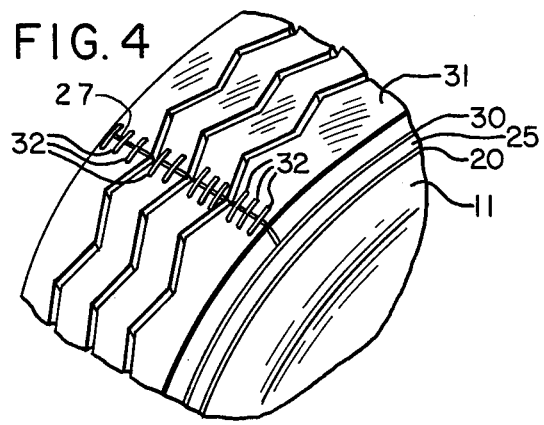
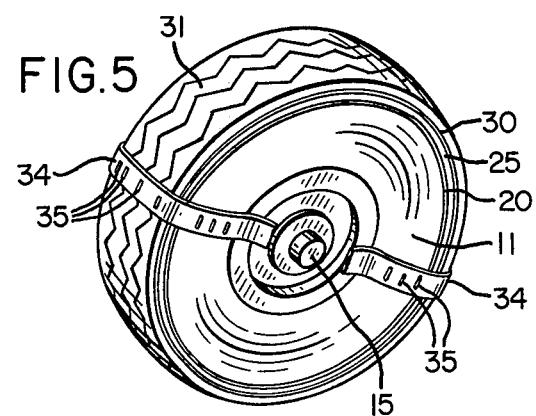
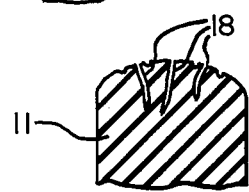
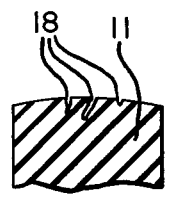
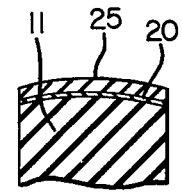
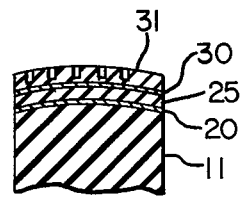
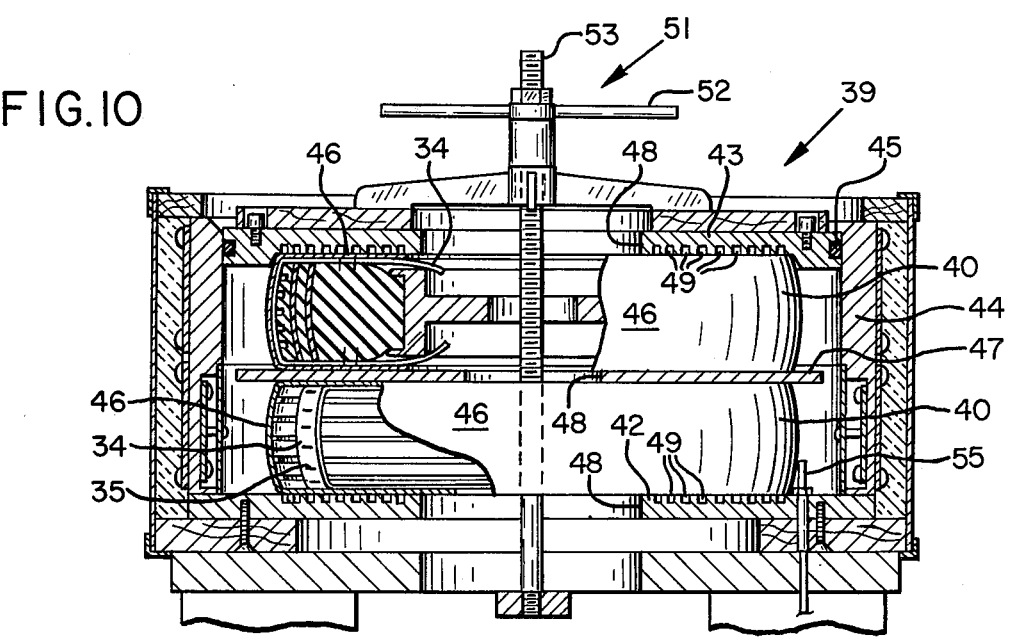

METHOD FOR RECAPPING SOLID TIRES WITH PRECURED, PREMOLDED TREAD

BACKGROUND OF THE INVENTION

The invention relates to the recapping of tires, and more particularly to an improved method for retreading solid tires.

Solid tires, generally used on industrial trucks in plants, supply yards, etc., are subjected to severe conditions of wear and tear. On many types of vehicles the solid tires are almost constantly driven over the nails and other metal fragments which become embedded in the tire tread and deeper. Also, lacking the resiliency of pneumatic tires, solid tires are subjected to greater stresses and often develop large cracks. At times, even loose chunks of material are torn or fall out of the tread.

Such unusual wear conditions often cause the tread of a solid industrial tire to deteriorate in an inordinately short period of time. Replacement costs are high. Also, with many types of rims, it is difficult to remove the tire from the rim and reuse the rim, because of the manner in which the tire is bonded or mounted to the rim. In many cases, the rim-mounted tire is simply discarded.

There has accordingly been a need for a method of effectively and efficiently retreading solid tires. Solid tires are well suited for recapping because they are used only at relatively low speeds and they develop tread injuries so frequently. An effective method of on-the-rim recapping would be ideal, since solid tires are usually difficult to remove from the rims.

U.S. Pat. No. 3,779,832 to Reppel, assigned to the same assignee as the present invention, discloses an efficient method for retreading pneumatic tires utilizing precured, premolded tread strips. By this method a pneumatic tire is bonded to the precured tread utilizing uncured rubber bonding material which is cured under heat and pressure, with some steps of the method similar to some steps of the present invention. Wheatley U.S. Pat. No. 2,014,010 also is directed to a retreading method for pneumatic tires.

However, the methods disclosed in these patents are not useful for solid tires, and no previous tire recapping method has been as effective, reliable and economical for solid tires as the present invention described below.

SUMMARY OF THE INVENTION

The method of the present invention provides an efficient solution to the problem of solid tire re-use. Tread worn and/or damaged solid tires are recapped with a precured, premolded tread strip which becomes integral with the old tire carcass through curing of a bonding layer to the buffed carcass surface and to the new tread. According to the invention, the rim-mounted used solid tire is gripped with an adapter by its rim and mounted on a buffing machine which removes rubber as it buffs the surface. The tire is buffed down, maintaining its roundness, until the old tread is removed, or deeper if this is desirable due to the depth of the injuries. As metal fragments are exposed during the buffing process, they are extracted. When the buffing is completed, the cuts and other injuries to the tire carcass are repaired. Sizable holes in the tire are filled with uncured rubber, which is tamped in to eliminate air. Next a cement coating is sprayed onto the buffed tire surface, and a layer of bonding gum, or cushion gum, a composition including uncured rubber, is applied to the cemented surface. If the tire has been buffed down substantially below the old tread, a base layer of precured rubber is laid over the bonding gum and spliced, to build up the tire diameter. Over the base layer another bonding gum layer is required, and the precured, premolded tread strip is applied over this. The tread is carefully cut to a slightly oversized length, to assure proper bonding and to allow for expansion, and the ends are butted with a patch of bonding gum between. The tread splice is secured temporarily, as with staples. Next the tread is stitched to the casing, i.e. it is tacked down by applying pressure at a series of points. Air-bleed wicking is then secured to the built-up tire, with each piece of wicking extending from sidewall to sidewall over the tread, and the assembly is put into a curing envelope. The enveloped, built-up tire is loaded into a curing module having opposed relatively movable surfaces which seal against the envelope at the sidewalls of the solid tire, and the peripheral wall of the module forms a chamber around the enveloped tire. This chamber is filled with heated, pressurized air or steam for a prescribed period of time and the uncured rubber layer or layers are cured to the already cured rubber, forming an integral retreaded tire.

During curing, any significant amount of air trapped between the built-up layers is forced out by the pressure applied to the tread via the envelope. The wicking is porous and gives this air and other air trapped within the envelope a means of escape to the atmosphere, since the wicking extends beyond the annular seals at the tire sidewalls. The envelope of course serves to apply the pressure evenly to the tread and to prevent the intrusion of any pressurized gas between th tread and the carcass.

Following curing the enveloped retreaded tire is removed from the module, and the envelope, wicking and staples are subsequently removed.

It is therefore among the objects of the invention to provide a new and improved tire recapping method whereby solid tires may be efficiently retreaded with a precured tread strip, producing an integral solid tire which stands up well under the usual severe wear conditions. This and other objects, advantages and features of the invention will be apparent from the following description of a preferred embodiment, taken in conjunction with the appended drawings.

DESCRIPTION OF THE DRAWINGS

FIG. 1 is a block diagram showing the steps of the invention in sequence.

FIG. 2 is a somewhat schematic perspective view showing a used solid tire being buffed to remove the old tread.

FIG. 3 is a perspective view indicating the application of the new tread to the carcass.

FIG. 4 is a partial view in perspective showing the tread stapled together temporarily.

FIG. 5 shows the wicking secured to the tire prior to enveloping.

FIGS. 6 through 9 show schematically a portion of the tire incross section at the various stages of the rebuilding process.

FIG. 10 shows the enveloped, built-up tire within a curing module.

DESCRIPTION OF A PREFERRED EMBODIMENT

In the drawings, FIG. 1 shows the process of the invention as sequential steps in a block diagram, or flow chart.

The first block 10 represents a thorough inspection of the old solid tire to determine its fitness for retreading. The inspection discoveres whether any serious structural damage has occurred which would render the tire unserviceable when capped. Normal cutting and chipping is expected in industrial tires and can be repaired. Generally any of the following conditions would call for rejection of the tire: reverted rubber, caused by excessively high temperatures during use, weakening the tire; band or rim distortion; undercutting of the tire just above the rim, caused by bulging of the tire over the rim in overloading; ply separations in filled solid tires; and excessive and deep damage by oil, grease, gasoline and other caustic substances.

The inspector removes all large obvious penetrants during the inspection process.

FIG. 6 indicates a used tire 11 with typical injuries to the tread and deeper.

The second block 12 of FIG. 1 represents the selection of an appropriate adapter for the rim on which the solid tire 11 is mounted, and the securing of the rim to the adapter so that the tire can be mounted on tire buffing and building apparatus. Rims for solid tires are of various types—some are simple cylindrical bands for press-fitting onto wheels; others are of different configurations including central web portions with lug holes or a central hole. An adapter is provided for each type of rim.

Once the rim is mounted on an appropriate adapter, the tire is connected via the adapter to a buffing machine, where the outer surface of the tire is buffed down, removing the old tread. The third block 13 of FIG. 1 represents the buffing operation, and FIG. 2 schematically indicates the buffing operation, showing the used tire 11 mounted on a rim 14, which is fastened to an adapter 15. The adapter connects to a template controlled buffing machine 16 to hold the tire in place during the buffing operation. The machine may be, for example, similar to the Precision Automatic/Hydraulic Industrial Model No. 30-1 manufactured by Retreading Equipment Inc., 2601 Wilkinson Blvd., Charlotte, N. C.

Blades or rasps 17 of the buffer cut or scrape down the tread surface uniformly as the tire is automatically rotated and pivoted as illustrated in FIG. 2.

The tire is usually full of cuts and other injuries, some containing metal fragments, and the buffing operation exposes some of these fragments. As the fragments are exposed, the operator removes them, and should do so before they are reached by the buffing blades. Some of the injuries 18 are indicated in FIGS. 2 and 6. If these injuries extend considerably below the old tread, in significant number and size, it may be desirable to buff down the carcass considerably below the old tread. In this case an additional layer of rubber is added beneath the new tread in the tire building process.

The buffing operation not only removes rubber and takes the tire carcass down to the desired diameter, but also produces a texture on the surface which should resemble suede leather for maximum adhesion. The rasps 17 on the buffing machine are selected for the desired texture. Sharp rasp blades should be used to avoid scorching the surface.

Provided the adapter and tire are properly mounted on the buffing machine 16, the buffing machine will produce a concentric buffed-down carcass for the tire building process. The diameter of the finished retreaded tire may or may not be critical. If it is, the tire carcass should be buffed to a diameter so that when the tire is rebuilt the finished diameter will be as desired. FIG. 7 indicates schematically in cross section a buffed-down tire which has been taken down considerably below the tread. Some of the deep injuries 18 still penetrate the carcass.

The next step in the block diagram of FIG. 1, identified as 21, is the extraction of buried metal fragments and repair of injuries to the tire carcass. Some of the fragments will have already been removed at this point, during the buffing process as explained above. The injuries to the carcass rubber should be skived out to remove all contaminated or oxidized surfaces, to insure that the repair material will bond adequately. The rubber dust from buffing and skiving is blown off the tire with oil free, dry compressed air. Cement is applied to the carcass injuries, and if the injury is more than a simple cut, it is filled with a composition including uncrued rubber when the cement is dry. An awl or similar tool is used to remove trapped air, and the patch is thoroughly stitched to the surrounding tire material. "Stitching" in the context of tire building refers to the application of pressure, with a stitching tool, to force two components or masses together, one of them usually being uncured rubber. Following stitching, excess material is removed from the repair so that it is flush with the buffed surface.

At this stage, the depth of each deeply penetrating repair should be marked on the sidewall of the tire to indicate that the tire will require extra curing time.

Some solid tires have an inner cavity containing a fill material such as polyurethane. Even if this fill material has been damaged or eroded, the tire can be repaired in many cases. The fill should be cut away until a clean surface is exposed, whereupon the fill material is replaced with new fill and cured according to the specification for the product, as the original material was cured. After curing, excess material is removed, and frayed or damaged cords are buffed to expose a clean surface. A section repair is made using the appropriate size repair patch as recommended by the manufacturer. The section repair should be flush with or below the buffed surface of the tire. The surface of the repair patch is then roughened slightly, as by buffing, and the surface injury is repaired in the normal manner.

Next cement is applied to the buffed tire surface, as indicated in the next block 22 of the block diagram of FIG. 1. This should be done as soon as possible after buffing, since the soft surface picks up contaminants quickly which would inhibit adhesion. In general the buffed surface should not remain longer than about four hours prior to cementing.

Any suitable rubber cement may be used, which is commercially available from sources well known to those in the tire recapping field. If the cement is applied by spraying, as is preferable, the cement must be of the continuous agitation type, and air to the spray gun should be dry and free of oil. The exposed tire surface should be thoroughly covered with cement, but should not be oversprayed, since the purpose of the cement is mainly to help build the tire prior to curing, rather than to perform any permanent adhesive effect.

Once the cement has dried, a bonding gum or cushion gum layer may be applied, as indicated at 23 in FIG. 1. The bonding gum layer is indicated at 20 in the schematic view of FIG. 8. This is an industrial bonding gum, containing or made up substantially entirely of uncured rubber. This begins the tire building operation, and the tire with its adapter should be mounted in a tire building apparatus, which can be any of the commercially available type which are usually used in tire building operations. Such a building machine usually has a foot pedal for use by an operator to rotate the tire as the built-up materials are applied to the tire.

A protective backing on the underside of the cushion gum is peeled off at the leading edge, and the strip is centered on the tire and the leading edge attached to the cemented surface. While the tire is rotated, the cushion is guided onto the center of the tire as the backing is peeled off. A slight overlap, preferably about ¼", is provided when the cut is made. Then the protective backing (usually polyethelene) is peeled back from the leading edge of the upper side of the cushion gum, and the trailing edge is then tacked down to form a complete circle around the tire.

The cushion gum layer is then stitched to the buffed tire, with the upper protective backing still in place. Such stitching is preferably accomplished automatically by the tire building apparatus. Following stitching, the upper protective backing is removed.

At this point, either the tread strip or a preliminary base layer may be applied, as indicated in FIG. 1. The base layer is applied if necessary to build the tire diameter up to a desired final size. The block 24 of FIG. 1 indicates the application of the base layer, and the base layer 25 is indicated schematically in FIG. 8.

In the application of the base layer, a freshly cut end of the roll-stored strip is first provided. If the existing cut at the leading end of the strip is old, a fresh cut is made, preferably on a power cutter capable of producing a square cut. Rubber dust is removed with a wire brush, and cement is applied to the freshly cut surface. The protective backing is peeled back from the underside of the base strip at the leading edge, and the leading edge is centered and adhered to the exposed bonding gum surface. This leading edge should be at a location rotationally spaced from the bonding gum splice.

The tire is rotated while the base strip is guided to a centered position. The operator hand tacks the base strip to the bonding gum below as the tire rotates, by application of pressure at sequential points. The underside backing is progressively removed as the strip is applied. As the tire approaches full rotation, the last two feet or so are not tacked down, but rotation is continued until the base overlaps. It is marked for cutting at a short overlap, e.g. about 1/16" past the leading edge. Approximately the last two feet of the strip are then pulled away from the tire and the strip is inserted into the cutting machine, where a square cut is made. Rubber dust is removed from the cut and the cut ends are immediately coated with cement.

The base layer splicing step, represented at 26 in FIG. 1, includes the use of a small patch of bonding gum to the leading edge of the base strip, now positioned on the tire. The bonding gum, or splicing gum, is stitched to the edge of the strip preferably with a hand roller.

As soon as the cement at the trailing end of the strip is dry, the protective backing is removed from the splicing gum and the free base strip end is aligned precisely with the leading end and attached to the tire. The splice is closed with a rowel or screwdriver. The base layer splice should then be hammered down with a rubber mallet to be sure that it is well secured. The hammering should start at the center of the tire and work outwardly toward the shoulders.

At this point the protective backing has been removed from the base layer, and the exposed outer surface has preferably been pre-coated with cement by the manufacturer of the base layer material. A further bonding gum layer is then applied as indicated in the block 28. This operation is similar to the application of the original bonding gum layer described above, and the layer 30 is indicated schematically in FIG. 9, which shows the fully built-up tire.

Next the tread is applied, either to the first bonding gum layer 20 or to the second bonding gum layer 30, as indicated in the block 29 in FIG. 1 and also illustrated schematically in FIG. 3. The application of the tread 31 is very similar to that of the base layer. FIG. 3 illustrates the tread being rolled onto the tire, having already been cut as described above in the discussion of the base layer. FIG. 4 shows a patch of bonding gum 27 between the ends of the tread 31, to bond the ends during curing. The gum 27 is applied as discussed above in connection with the base layer 25. One important difference in the tread splice, as compared to the base layer splice, is that the tread splice is more critical, since the tread forms the final exterior surface of the tire, and the splice should be held together by some temporary securing means until the curing of the retreaded tire is complete. Thus, staples 32 may be applied across the splice, as illustrated in FIG. 4 and indicated in the block 33 of FIG. 1. Also, the tread should be stitched to the casing following splicing. This is done preferably by tread stitching apparatus included on the tire builder, on which the built-up tire is mounted.

The schematic view of FIG. 9 shows the fully built-up tire with the several layers, which may include the base layer, and first bonding gum layer 20.

The next step is to secure wicking material 34 to the built-up tire, as illustrated in FIG. 5 and represented in the block 36 of FIG. 1. The wicking strips 34 comprise some suitable type of mesh material, as nylon, which is porous enough to permit air to bleed through an otherwise sealed annulus during curing. The wicking and its function are conventional, and are shown, for example, in U.S. Pat. No. 3,779,832, cited above. The function of the wicking will be further explained below. The wicking extends over the tire tread from sidewall to sidewall, as shown in FIG. 5, and is preferably held to the solid tire by staples 35.

The built-up tire, with wicking strips attached, is next inserted into a curing envelope as indicated in the block 37 of FIG. 1. The envelope is of the well-known type, similar to that described in the above-referenced U.S. Pat. No. 3,779,832. The envelope of course assures an evenly applied pressure on the tread and other components of the built-up tire, as well as preventing the intrusion of pressurized gas between the layers during the curing operation.

The enveloped tire is then loaded into a curing module, as represented in the block 38 of FIG. 1. The module 39, illustrated in FIG. 10, may receive one or a plurality of enveloped, built-up tires for curing. FIG. 10 shows two tires 40 within the module 39, with the module closed and sealed, ready for the application of heat and pressure to the tread areas of the tires.

FIG. 10 is a schematic representation of the module with the tires being treated, but it shows the basic structure of the module 39, which is commerically available and does not in itself form a part of this invention. The module includes a pair of opposed of relatively movable walls 42 and 43, and a peripheral wall 44 which may be cylindrical. As illustrated, the wall 42 may be stationary and affixed to the peripheral wall 44, while the wall 43 is movable, having a peripheral seal 45 which engages the inside surface of the wall 44 when the module is closed. If a single tire 40 is loaded in the module, the opposed walls 42 and 43 engage the envelope 46 of the tire, pressing against the envelope in sealing annuli at either side, and also pressing the envelope against the tire's sidewalls. The wicking 34 extends to beyond the sealing annuli, as can be envisioned from FIG. 10, which shows two tires. Air which may be trapped between the built-up tire layers or within the envelope 46 is thus able to exit via the wicking.

The method of the invention is efficiently carried out by the loading of two or more tires 40 into the curing module, as shown in FIG. 10. When multiple tires are loaded, a spacer plate 47 is interposed between adjacent tires 40 as indicated. This forms sealing annuli against the envelopes of the adjacent tires, and since the plate 47 does not reach the chamber wall 44, the peripheral space surrounding the envelopes 46 becomes a common pressure chamber for all the tires in the module 39.

As indicated in FIG. 10, the opposed walls 42 and 43 of the module, as well as the spacer plate 47, have central openings 48 so that all space interior of the sidewall sealing annuli is open to the atmosphere and trapped air can escape through the wicking 34 to atmospheric pressure. FIG. 10 also shows concentric grooves 49 which are preferably formed in the opposed walls 42 and 43 at the sealing areas, to aid in sealing against the envelopes 34. The effect of the grooves is to form multiple seals at each sealing location. The spacer plates 47 also preferably include such grooves (not illustrated).

When the enveloped tires have been loaded into the module 39, the upper wall 43 is positioned in place against the uppermost tire and then is tightened down to create sufficient sealing pressure at each envelope-to-wall or envelope-to-spacer plate sealing location. This may be done by means of a threaded tightening device 51 as indicated, being connected to force the upper wall 43 downwardly toward the lower wall 42 when a threaded locking bar 52 is tightened down on a threaded rod 53. Heat and pressure are introduced through a nozzle inlet 55, in the form of steam or hot pressurized air. The heat and pressure are applied (block 57 in FIG. 1) in sufficient magnitude and for a sufficient time to cure the uncured rubber or bonding gum layer(s) to the adjacent precured rubber surfaces, but not long enough to cause any significant damage to the precured rubber of the tread, the base layer (if used) and the tire carcass. As indicated above, curing time may vary depending upon the depth of carcass injuries which have been filled with uncured rubber. However, if there are no such significant injuries, the typical curing operation will be at about 70 p.s.i. and 310° F. for about 120 minutes. Pressure is maintained during the curing/bonding cycle by continued application of air or steam at the nozzle inlet 55.

When the curing/bonding cycle has been completed, the air or steam supply to the chamber is discontinued, and existing pressure within the chamber is exhausted. The locking bar 52 is loosened, the upper module wall 43 is lifted and the enveloped retreaded ties are removed, as represented in the block 58 of FIG. 1. The envelopes 46 are pulled away from the tire sidewalls right away, since the bonding gum contacts the envelope, partially bonding to it and this bond is most easily broken while the gum is at an elevated temperature.

After the envelope has partially cooled, e.g. after about ten minutes, it is removed from the tire. While the envelope is still warm, it is then turned inside out and sprayed with a lubricating agent to prepare it for the next usage.

After a final inspection of the retreaded tire, the wicking and staples are removed from the tire, and black tire paint is applied, if desired.

The above described method describes an efficient procedure for applying a precured, premolded tire tread to a used solid tire, resulting in an integral and reliable capped tire. Various other embodiments and alterations to this preferred embodiment will be apparent to those skilled in the art and may be made without departing from the spirit and scope of the following claims.

I claim:
1. A method of retreading a rim-mounted solid tire with a precured, premolded tread strip, comprising:
   gripping the solid tire by the rim, with an appropriate adapter;
   mounting the solid tire, via the adapter, on a buffing machine and buffing the outer peripheral surface of the tire down concentrically, removing the old tread and continuing to buff the tire down below the base of the old tread;
   extracting from the tire carcass metal and other fragments exposed during the buffing process;
   repairing cuts and other injuries to the tire carcass, if any, including filling holes with uncured rubber, eliminating substantially all air from the holes;
   applying a cement coating to the buffed surface of the tire;
   applying a layer of bonding gum, including uncured rubber, to the surface of the tire over the cement coating;
   applying a base layer of premolded, precured rubber over the bonding gum, to build up the tire diameter;
   adhering a second bonding gum layer to the surface of the base layer;
   applying a precured, premolded tread strip over the bonding gum layer;
   splicing the tread strip utilizing bonding gum between the ends;
   securing the splice together with a temporary securing means;
   stitching the tread to the casing;
   securing wicking to the built-up tire, extending from sidewall to sidewall over the tread;
   applying an envelope over the built-up tire and wicking, extending over the tread and most of each sidewall;
   loading the enveloped, built-up tire into a curing module having a generally cylindrical peripheral wall and relatively movable opposed wall portions for pressing against the enveloped sidewalls of the tire;
   forming a sealed annular space about the envelope and within the module by urging at least one of the relatively movable opposed wall portions toward the other to engage the tire sidewalls, thereby forming a sealing annulus at each sidewall of the tire, with the envelope and wicking sandwiched between the sidewall and the adjacent wall portion of the curing module;

introducing a heated pressurized gas into the sealed annular space and maintaining it for a predetermined curing time, thereby securing the tread, bonding gum, base layer and tire carcass together by pressing them together and curing the uncured rubber while forcing out air present between the layers via the wicking;

removing the retreaded solid tire from the curing apparatus; and removing the envelope, wicking and temporary securing means from the retreaded tire.

2. The method of claim 1 wherein the step of applying the tread strip comprises:

cleaning and applying cement to a freshly cut end from a rolled strip of tread having a protective backing;

attaching the leading edge of the tread to the exposed bonding gum on the tire, at a location rotationally spaced from the bonding gum splice;

rotating the tire to draw the tread onto the tire, while guiding the tread to a centered position and while progressively removing the protective backing;

marking the strip of tread for cutting, at a slight overlap from the leading edge;

cutting the strip of tread on a tread cutter; and cleaning rubber dust from the cut end and applying cement.

3. The method of claim 1 wherein the steps of applying the precured, premolded base layer and of applying the precured, premolded tread strip each comprise:

cleaning and applying cement to a freshly cut end from a rolled precut, premolded strip having a protective backing;

attaching the leading edge of the premolded strip to the exposed bonding gum on the tire, at a location rotationally spaced from the bonding gum splice;

rotating the tire to draw the premolded strip onto the tire, while guiding the strip to a centered position and while progressively removing the protective backing;

marking the strip for cutting, at a slight overlap from the leading edge;

cutting the strip on a machine cutter; and cleaning rubber dust from the cut end and applying cement.

4. The method of claim 1 wherein the step of splicing the tread strip includes hammering down the ends of the tread strip at the splice with a mallet, starting at the center of the tread and working out toward the shoulders.

5. The method of claim 1 which includes loading a plurality of enveloped, built-up tires into the curing module, with a spacer plate between adjacent enveloped tires, so that seals form against the spacer plates as well as against the end wall portions of the module.

6. The method of claim 1, including noting the depth of any deep holes filled with uncured rubber in the repairing process, and maintaining curing heat and pressure for an accordingly longer time.

7. The method of claim 1 wherein each step of applying a bonding gum layer comprises:

advancing the leading end of a strip of bonding gum from a roll, said strip having protective backing on both surfaces;

securing the leading end of the strip of bonding gum to the cement-coated surface of the tire;

rotating the tire to draw the bonding gum strip onto the tire, while guiding the strip to a centered position and while progressively removing the protective backing from the underside of the strip;

cutting the bonding gum strip so as to form a small overlap;

peeling back the protective backing from the upper side of the leading edge of the bonding gum layer;

tacking down the trailing edge of the strip, overlapping the leading edge;

stitching the bonding gum layer to the tire with the upper protective backing in place; and removing the upper protective backing.

8. A method of recapping a rim mounted solid tire with precured thread rubber, comprising:

preparing the used solid tire for recapping, including buffing the tire surface to remove the old tread and to prepare the surface of the tire carcass, the tire being buffed down substantially below the old tread to remove deep injuries;

extracting from the tire carcass metal and other fragments exposed during the buffing process;

repairing cuts and other injuries to the tire carcass, if any, including filling holes with uncured rubber;

applying intermediate bonding material to the carcass surface, including a layer of bonding gum containing uncured rubber;

applying a base layer of precured rubber over the bonding gum layer, and applying a second bonding gum layer over the base layer;

applying a precured, premolded tread strip over the second bonding gum layer;

splicing the tread strip utilizing bonding gum between the ends;

securing the splice together with a temporary securing means;

placing wicking material across the tread surface, from sidewall to sidewall;

enveloping the tire assembly;

placing the enveloped, built-up tire assembly in a curing module having a generally cylindrical peripheral wall and annular sealing means including relatively movable opposed wall portions for pressing and sealing against the envelope at both tire sidewalls to form a sealed space around the envelope; and supplying heat and pressure in the spaces to press the envelope and the tread strip against the tire carcass while curing the internal layer of bonding material, thereby securing the layers together and forming an integral retreaded tire.

* * * * *